Feb. 7, 1956 J. DAUBEN 2,733,773
ARRANGEMENT OF STEERING GEAR AND
CONTROLS IN MOTOR VEHICLES
Filed March 8, 1950 2 Sheets-Sheet 2
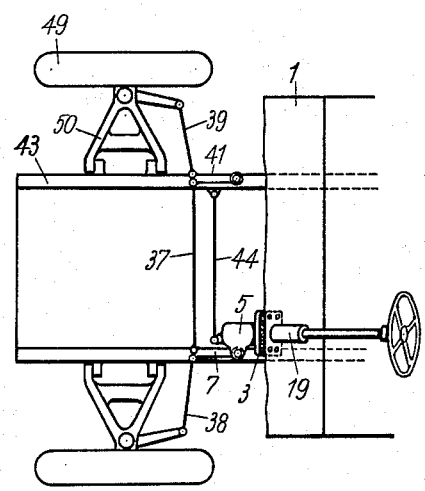
Fig. 5
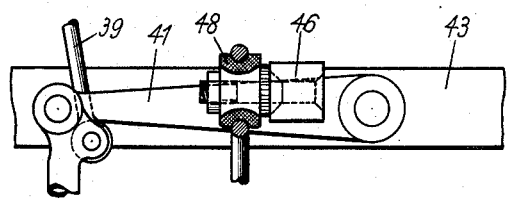
Fig. 4
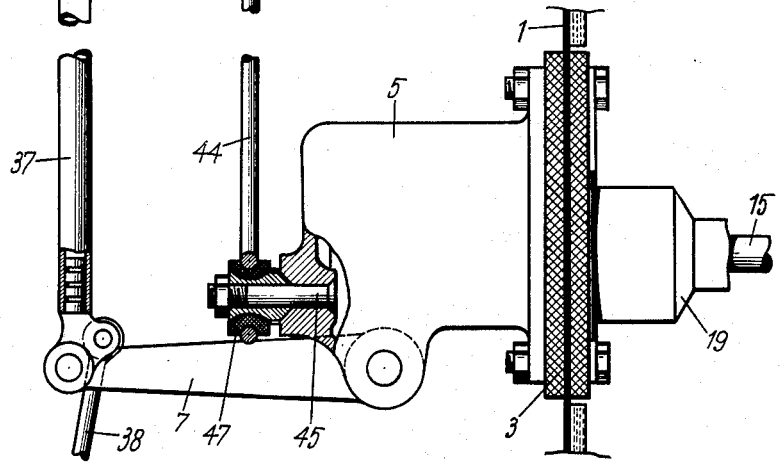
INVENTOR.
Joseph Dauben
BY
Diehl and Padlon
ATTORNEYS.

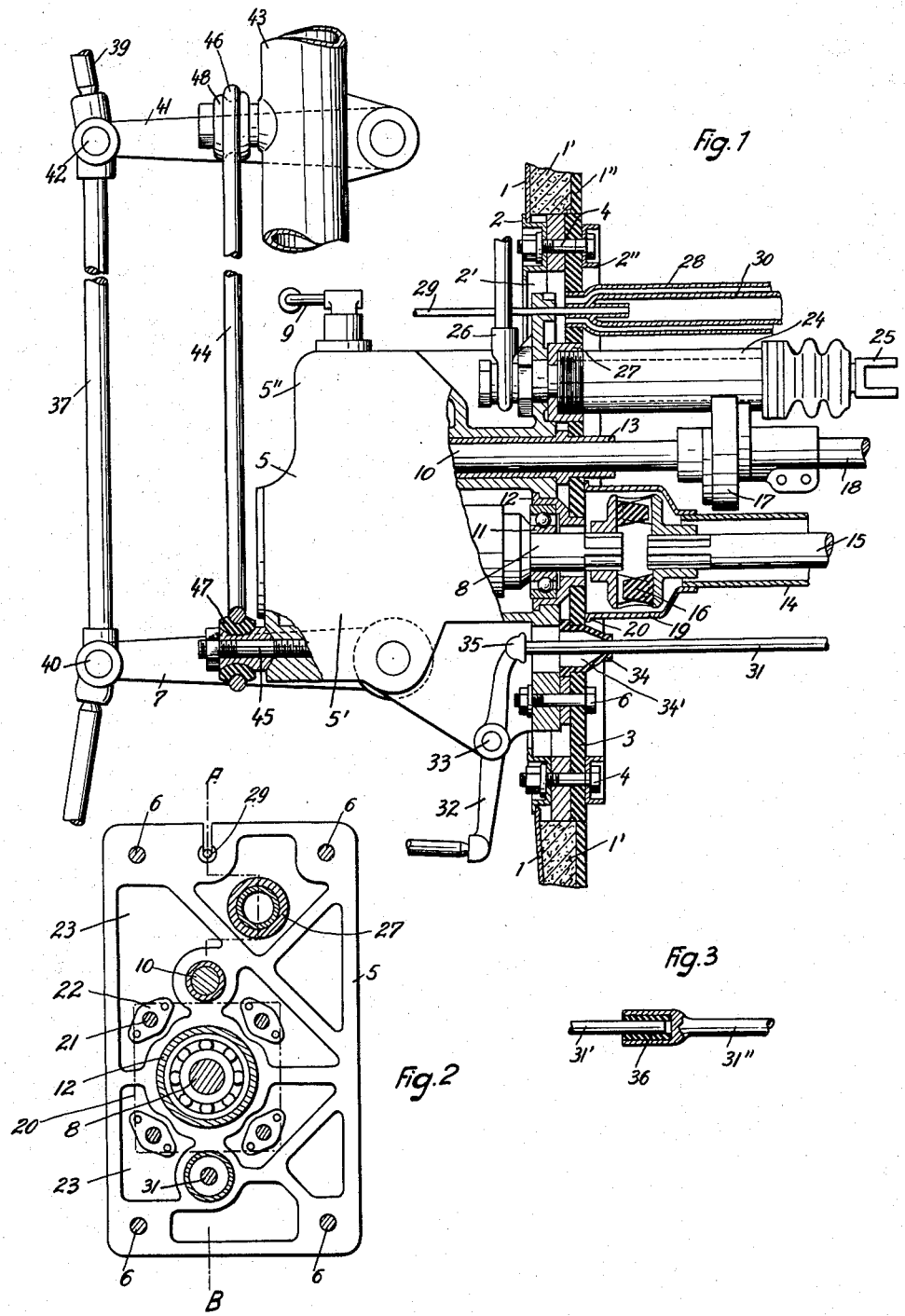

United States Patent Office 2,733,773
Patented Feb. 7, 1956

2,733,773

ARRANGEMENT OF STEERING GEAR AND CONTROLS IN MOTOR VEHICLES

Joseph Dauben, Stuttgart, Germany, assignor to Daimler-Benz Aktiengesellschaft, Stuttgart-Unterturkheim, Germany Application March 8, 1950, Serial No. 148,484

Claims priority, application Germany March 10, 1949

7 Claims. (Cl. 180—90)

This invention relates to an arrangement of the steering gear and of the controls in motor vehicles. It is one main object of the invention to provide as effective as possible a prevention of the transmission of noise by the steering gear and the controls from the engine space or gearing space to the driver's space. The invention further aims at as convenient as possible a location and mounting of those parts, in particular also of the parts of the steering gear case.

One of the main sources of the noises entering the interior of the car body are the engine and gearing spaces. Proposals have been made, therefore, to quiet such noises by providing sound absorbing walls separating the interior space of the car body from the engine and gearing spaces. Such provision, however, does not permit a complete quieting of noise. The present invention is based upon the recognition that a transmission of noise takes place mainly through the linkages, leads etc. traversing the walls, especially through the steering gear and the shift actuating linkages or the like, in particular, if they have, as, for example, in the case of the gear shift lever, direct metallic connection with the engine, the gearing, or other structural elements which act as a source of noise or which are capable of transmitting noise, such as, for example, the steering gear case.

One feature of the invention accordingly consists in that for preventing the transmission of noises or vibrations from the engine or gearing spaces into the driver's space of the body, the metallic connection both in the drive connections and in the casing parts of the steering and shifting mechanisms between the engine or gearing spaces and the driver's space is interrupted by a sound-proof material, preferably rubber.

In particular, this is effected by interrupting the drive connections and the linkage parts, such as the steering wheel shaft or the gear shift lever or rod by means of rubber couplings whilst the casing parts such as steering gear and the steering column may be mounted insulated from each other at the body wall. This mounting is preferably effected by the provision of a sound absorbing wall piece containing the passages for the steering linkage and the shift actuating elements etc., for example, a rubber plate inserted into the dashboard of the driver's space or interior space of the car body, in which rubber plate the casing parts are secured at opposite sides without metallic contact or connection with each other.

In addition to the driving and housing parts for the steering mechanism and the gear shift mechanism, all of the other linkages, leads or the like leading from the driver's space into the engine or gearing spaces are conveniently insulated against transmission of noises and vibrations. The individual driving parts, linkages or leads may be passed in this case with sound insulation through one or a plurality of separating walls between the two spaces, either each for itself, one alongside the other or assembled to form a common structural unit. The greatest possible effect of sound deadening is obtained in any case if there is no metallic connection whatsoever from the engine or gearing spaces to the driver's or interior space, in particular in those parts having direct metallic connection with the engine or the gearing or other possible sources of noise.

It will further be of advantage to make also the rest of the dashboard sound absorbing, for instance, by the application of a felt lining.

Further features and details of the invention will become apparent from a consideration of the following description, reference being had to the accompanying drawings wherein:

Fig. 1 is a sectional view of the longitudinal axis of the steering column taken on line A—B of Figure 2;

Fig. 2 is a top plan view of the steering gear case including the shifting gear box seen from the steering wheel, showing the mounting of the steering column at the sound insulating intermediate plate (not shown in Fig. 2);

Fig. 3 is a sound insulating subdivision for the linkage of the clutch, of the accelerator pedal or other similar linkage.

Fig. 4 is a modified arrangement of the steering gear case and the steering linkage.

Fig. 5 is a diagrammatic plan view of the front part of a motor vehicle chassis.

In the front wall or dashboard 1 of the driver's space or of the interior of the car body covered with a layer 1' of felt and a rubber mat 1" and separating the interior of the car body from the engine-gearing space, there is provided an opening 2' bordered by a frame 2, said opening 2' being covered by a plate 3 consisting of a sound insulating material, such as rubber with an insert of fabric, attached by bolts 4 to the frame 2 and stiffened by a counter-frame 2". The plate 3 has a number of passage openings and serves simultaneously for mounting the housing 5 located laterally in the engine-gearing space and fixed to the rubber plate by means of bolts 6. The housing, on the one hand, includes the steering gear 5' actuating the steering knuckle gear rod arm 7 and being driven by a shaft 8 and, on the other, a change speed gear 5" which latter actuates a lever 9 connected to the shift actuating mechanism of the change speed gear and is in turn actuated by a rod or shaft 10. The shaft 8 of the steering gear is mounted in a ball bearing 11 located in a bushing 12 which is in turn inserted into the casing 5 and centered in a bore of the plate 3. In a similar way the rod or shaft 10 for the shift actuating mechanism is mounted in a bushing 13.

The shaft 8 is further connected to the steering wheel shaft 15 located within the steering column 14 and driven by the steering wheel by a sound insulating rubber coupling 16, the shaft or rod 10 being likewise connected by an elastic, sound-insulating coupling 17 to the shifting member 18, which may, e. g., be rotatably and slidably mounted on the steering column 14. The lower part of 19 of the steering column is enlarged in the form of a casing and supported by means of its flange 20 on the sound insulating plate 3, to which it is secured, for instance, by four bolts 21 (Fig. 2) and counter-flanges 22 opposite the flange 20 in such a manner that there is no metallic contact between the bolts 21 and the flanges 22 on the one hand, and the housing 5 of the steering gear on the other. The casing possesses for this purpose at its bearing surface recesses 23 into which the bolts 21 with the flanges 22 freely project.

It will be noted that in this manner there is no metallic connection between the steering column 14, the steering wheel shaft 15 and the shift actuating member 18, on the one hand, and between the housing 5 of the steering gear and of the change speed gear and the shafts 8 and 10, on the other, so that noises from the engine-gearing spaces can be transmitted neither to the steering wheel shaft 15 and the shift actuating member 18 respectively nor from the steering gear case 5 to the steering column 14 and therewith to the interior of the car body. The couplings 16 and 17 in that case are conveniently located as close as possible to the separating wall and the insulating plate 3.

In a similar way, conveniently and as far as possible, also all of the other linkages or connections of the leads are insulated to prevent transmission of noise in which case they may be mounted likewise in the plate 3 or passed therethrough. Thus, for instance, in the case of the example of construction illustrated in Fig. 1, there is provided an oil pressure operated braking cylinder 24, the piston of which will be actuated by the brake pedal by means of its coupling member 25 and which through the medium of the connection 26 for the pressure conduits leading to the brakes is mounted in a flange type lug of the housing 5 and by means of a bushing 27 or possibly also independently of the housing 5 in or at the insulating plate 3. The brake cylinder 24 may be supported in the bushing 27 by using rubber, a sound insulating packing or the like therebetween, so that also in this case the metallic connection between the parts 26 and 24 is interrupted.

Fig. 1 further shows the passage of the hand brake linkage through the plate 3. To this end, a tube 28 is mounted in the plate 3, including a hand operated actuating member 30 actuating the cable 29 by traction and serving as a guide for the latter. Since the cable 29 practically excludes the transmission of noises, it is possible—even in the case of an additional guiding in a bore or in a slot in the housing 5—to omit a special sound insulation. The plate 3 is further traversed by a linkage 31 which is actuated by the clutch pedal mounted, for instance, on the steering column and operates the clutch by means of a lever 32 fulcrumed at 33 on the steering gear case 5. A sleeve 34 seals the passage of the linkage 31 through an opening 34' in the plate 3. It is convenient also in this case to interrupt the linkage by the interposition of sound insulating material. For this purpose, for example, the articulation 35 may be provided with a rubber lining or the linkage may be made, as shown in Fig. 3, of two parts, the linkage elements 31', 31" being coupled with each other by a rubber bushing 36 fixedly secured, for example, by vulcanization, pressing or in any other suitable manner.

In a similar manner as the clutch actuating linkage, the linkage of the "accelerator pedal" or of any other control device for the engine output as well as any other linkages, leads or the like may also be led through the plate 3 and through the separating wall 1, 1'.

As diagrammatically indicated in Fig. 1, the steering of the wheels, which, for example, may be suspended independently by means of a rectangular linkage, is effected by a subdivided steering tie rod 37, 38, 39 which is actuated by the steering knuckle gear rod arm 7 with the joint 40. A guide rod 41 for the steering linkage with the joint 42, which corresponds to the arm 7, is supported on the frame member 43. Since the latter as a rule to a certain degree moves with relation to the car body and consequently also with respect to the steering gear case 5, the frame member 43 is coupled with the case 5 by a thrust tube or coupling member 44 which is connected to both parts in joints 45, 46 by interposed rubber rings 47, 48. A lateral movement of the frame member 43 with respect to the steering gear case 5 is substantially prevented thereby and undesired influences on the steering movements of the wheels are thereby eliminated. Such an arrangement of the steering linkage may be used in combination with modified forms of steering linkages or with steering gears elastically supported in a modified manner on the vehicle body or on any other vehicle-superstructure part. A form of arrangement similar to Fig. 1 is shown in Fig. 4. The joints 40 and 42 may, for instance, connect the link members of lever arms 7 and 41 to the tie rods 38, 39 respectively. As shown in Fig. 5 the wheels 49 may be guided with respect to the frame or frame member 43, for example, by two superposed link members 50 guiding the wheels in a manner of a parallelogram, preferably in such a way that the tie rods 38, 39 have substantially the same swinging radius as the supporting member of the wheel. Body 1 and frame 43 may be elastically supported against each other in any suitable way, for instance, by rubber buffers or the like. Furthermore the frame member 43 may be a part of an auxiliary frame supporting, for example, the driving aggregate.

Generally speaking, although a specific embodiment of the invention has been shown and described, it is to be understood, of course, that modifications may be made therein within the scope and spirit of this invention.

What I claim is:

1. In a motor vehicle, the combination comprising a steering gear, a housing encasing the same and having a flange, a steering column having a flange, a steering shaft extending within said column and into said housing, a sound-absorbing cushion interposed between and connected with both of said flanges, and a sound-absorbing coupling inserted in said steering shaft near said cushion.

2. In a motor vehicle, the combination comprising a panel of sound-absorbing material constituting a partition between the engine compartment and the passenger compartment, a housing located in said engine compartment adapted to be mounted on said panel, a steering gear encased in said housing, a shaft connected with and adapted to operate said steering gear and extending through said panel into said passenger compartment for connection with a steering wheel, said shaft being composed of two sections, one section being substantially located within said engine compartment and the other section being substantially located within said passenger compartment, a sound-absorbing coupling located near said panel and connecting said shaft sections, a steering column surrounding said shaft, and means for mounting said steering column and said steering gear housing on said panel on opposite sides thereof in registering relationship out of metallic contact with each other.

3. In a motor vehicle, the combination comprising a frame, a panel of sound-absorbing material carried by said frame and constituting a partition between the engine compartment and the passenger compartment, a housing located in said engine compartment and having a flange mounted on said panel in contact therewith and out of contact with said frame, a steering gear encased in said housing, and a brace fixed to said housing at a point spaced from said panel and attached to said frame of the motor vehicle.

4. In a motor vehicle, the combination comprising a frame, a sound-absorbing panel carried by said frame and constituting a partition between the engine compartment and the passenger compartment, a rubber plate constituting a part of said partition, a housing located in said engine compartment and having a flange attached to said rubber plate in contact therewith, a steering gear encased in said housing, a steering shaft connected to and adapted to actuate said steering gear and extending out of said housing through said rubber plate into said passenger compartment, and means located within said engine compartment in spaced relationship to said panel to connect said housing to said frame of the motor vehicle.

5. In a motor vehicle, the combination comprising a panel constituting a partition between the engine compartment and the passenger compartment, an opening in said panel, a rubber plate, a rigid frame connected with the margin of said rubber plate, said frame being inserted in and closing said opening, a support located in said engine compartment and mounted on said rubber plate out of contact with said frame, mechanisms carried by said support, elements connected with said mechanisms and extending therefrom through said rubber plate into said passenger compartment for actuation by the driver, and sound-absorbing couplings inserted in said elements near said rubber plate.

6. In a motor vehicle, the combination comprising a panel of sound-absorbing material constituting a partition between the engine compartment and the passenger compartment, a plate of resilient material constituting part of said panel, a pair of supporting elements, means for mounting one element of said pair on one side of said plate, means spaced from said first mentioned means and adapted to mount the other element of said pair on the other side of said plate, an actuating element composed of two sections extending through a hole provided in said plate, and a sound-absorbing coupling connecting the sections of said actuating element, one section thereof being carried by one supporting element of said pair and the other section thereof being carried by the other supporting element of said pair.

7. The combination set forth in claim 5, in which said panel is composed of a plurality of plies, one of such plies consisting of felt.

References Cited in the file of this patent

UNITED STATES PATENTS

| | | |
|---|---|---|
| 1,572,519 | Davis | Feb. 9, 1926 |
| 1,707,747 | Whitten | Apr. 2, 1929 |
| 1,878,086 | Woodall et al. | Sept. 20, 1932 |
| 1,884,415 | Vrooman | Oct. 25, 1932 |
| 1,945,717 | Woodall | Feb. 6, 1934 |
| 2,152,506 | Thorne | Mar. 28, 1939 |
| 2,246,833 | Beemer | June 24, 1941 |
| 2,250,510 | Van Buren | July 29, 1941 |
| 2,336,511 | Stolte | Dec. 14, 1943 |
| 2,549,925 | Paton | Apr. 24, 1951 |

FOREIGN PATENTS

| | | |
|---|---|---|
| 567,772 | France | Dec. 12, 1923 |
| 23,739 of 1911 | Great Britain | Oct. 28, 1912 |